No. 704,871. Patented July 15, 1902.
J. B. DAVIS.
BICYCLE ATTACHMENT.
(Application filed Mar. 14, 1902.)
(No Model.)
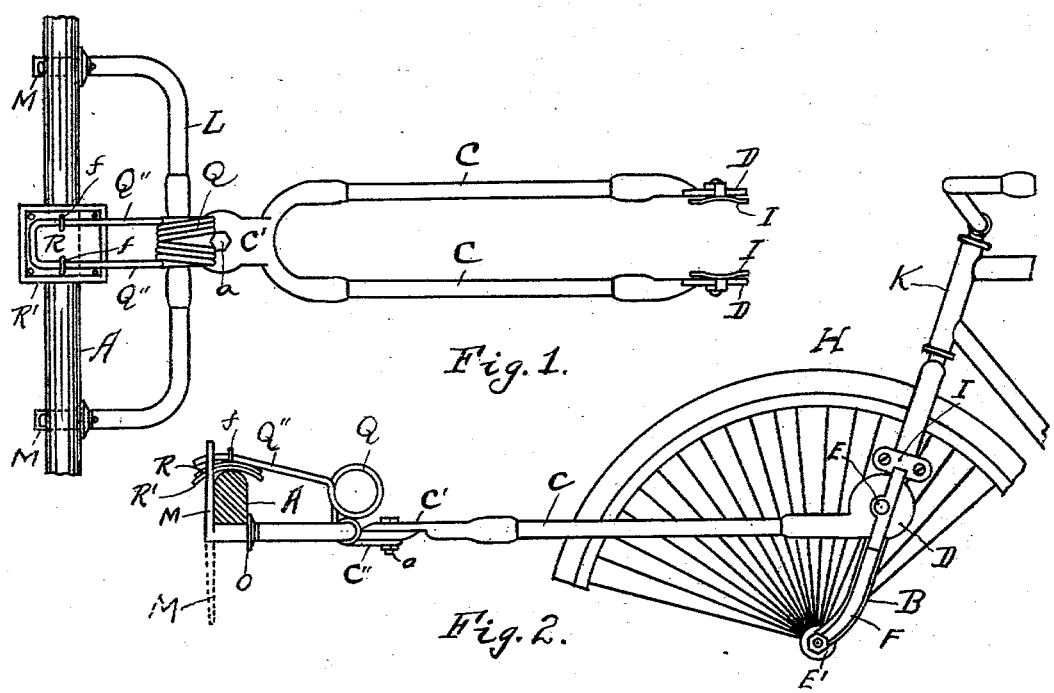
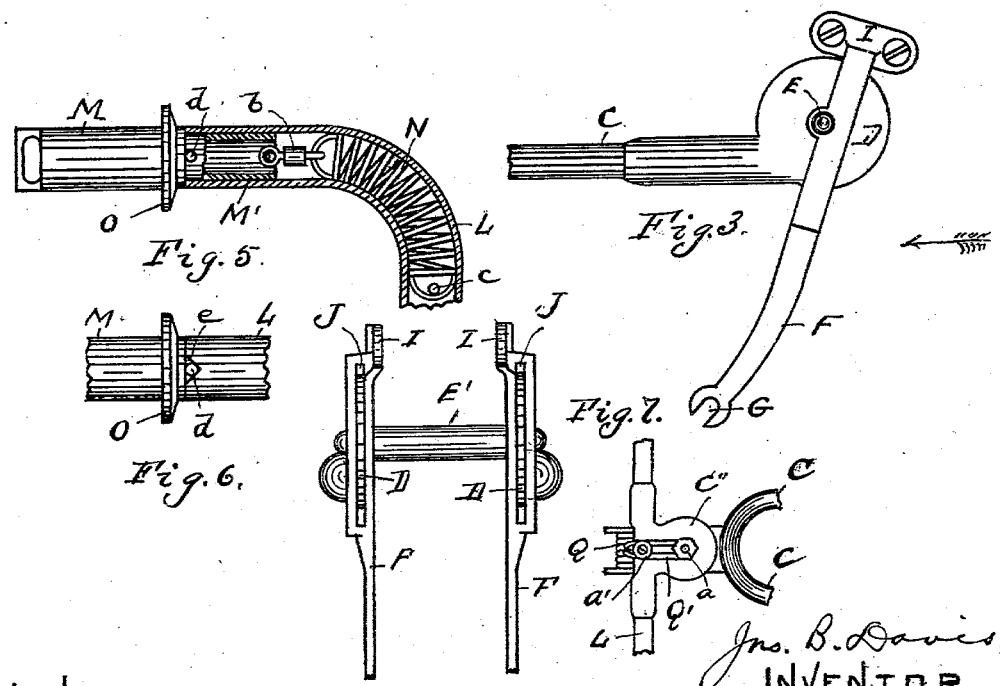
WITNESSES
Matthew Subler
C. M. Theobald
INVENTOR
Jno. B. Davis.
By R. J. McCarty
his ATTORNEY

UNITED STATES PATENT OFFICE.

JOHN B. DAVIS, OF DAYTON, OHIO, ASSIGNOR OF ONE-HALF TO W. J. PETERS AND N. B. PETERS, OF TROY, OHIO.

BICYCLE ATTACHMENT.

SPECIFICATION forming part of Letters Patent No. 704,871, dated July 15, 1902.

Application filed March 14, 1902. Serial No. 98,160. (No model.)

*To all whom it may concern:*

Be it known that I, JOHN B. DAVIS, a citizen of the United States, residing at Dayton, in the county of Montgomery and State of Ohio, have invented certain new and useful Improvements in Bicycle Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in bicycle attachments and comprises means for leading a bicycle in the rear of a vehicle.

The invention is especially adapted for the use of livery-stables in delivering vehicles to customers.

In sending a vehicle to a customer a bicycle may be easily attached to and led in the rear of such vehicle, to be used by the person delivering the vehicle as means for returning to the stable, thus avoiding the expenditure of street-car fare and effecting a saving of time in returning to the stable when there are no street-car facilities or dispensing with the necessity of taking an additional horse upon which to return to the stable.

The invention is an improvement of the bicycle attachment shown and described in Letters Patent No. 667,154, granted to W. S. McDonald and myself January 29, 1901.

Preceding a detail description of the invention reference is made to the accompanying drawings, of which—

Figure 1 is a top plan view of my improved bicycle attachment, showing the same connected to the rear axle of a vehicle. Fig. 2 is a side elevation of the same, showing the same attached to the front wheel of a bicycle. Fig. 3 is an enlarged side elevation of the parts for attaching the device to the steering-fork of the bicycle. Fig. 4 is an elevation looking in the direction of the arrow in Fig. 3. Fig. 5 is an enlarged partial sectional detail of one end of the bow or yoke by means of which the attachment is connected to the rear of the axle of a vehicle. Fig. 6 is a detail view of a portion of one end of the bow or yoke. Fig. 7 is a detail bottom view of a portion of the attachment.

In the detail description of the invention similar reference characters indicate corresponding parts.

The attachment, as shown in Figs. 1 and 2 of the drawings, is placed between the rear axle A of the vehicle and the steering-fork B of a bicycle. C C designate a fork, the ends of which inclose each side of the steering-fork B of the bicycle. The ends of said fork C C terminate in disks D, to which are pivoted at E arms F, the lower ends of said arms being bifurcated, as at G, to straddle the spindle of the front wheel H of the bicycle, the said bifurcated ends G being on the outside of the steering-fork B of the bicycle when in such position, as shown in Fig. 2. The upper ends of the arms F terminate in ears I, by means of which said arms are clamped around the steering-fork of the bicycle to hold the upper ends in position. That portion of the arms F adjacent to the pivotal point E is slotted, as at J, Fig. 4, to inclose the disks D on each side. The arms F at their lower ends have a connection with the spindle E' by means of the forked ends G.

Referring to Fig. 2, it is easily discernible how the attachment may be elevated against the steering-head K of the bicycle and there maintained in position by one hand of the rider or otherwise. The other end of the fork C terminates in a horizontal plate or disk C', which has a pivotal connection to a lower plate C'', said pivotal connection being connected by means of a bolt a. The lower plate C'' extends from the bow or yoke L. The ends of said bow or yoke, it will be seen, terminate in curvatures and have connected to them hooks or angular arms M. The hooks or arms M, in order to be moved in positions shown in full and dotted lines in Fig. 2, have a swivel and spring-controlled connection with the ends of the bow or yoke. Such connections are clearly shown in Figs. 5 and 6 of the drawings and consist of swivels b, one end of each of which is connected to an inclosed end M' of the hooks or arms, and the other end of each of said swivels b is connected to a spring N, which is inclosed within the ends of the bow or yoke L and connected to a pin c on the interior of each end of said bow or yoke.

The ends of the hooks or arms M, which abut with the ends of the bow or yoke L, are provided with flanges O and also pins d. The ends of the bow or yoke, which abut with the flanged ends of the hooks, have cam-slots e on opposite sides thereof. (See Fig. 6.) The pins d interlock with these cam-slots e to hold the hooks or arms M in either of the positions as shown in Fig. 2, said hooks being shown in full lines in an operative position and in dotted lines out of an operative position. When in an operative position, the said hooks or arms M lie in the rear of the vehicle-axle A, as shown in Fig. 2, and serve to prevent the attachment from leaving the vehicle when the latter is leading a bicycle.

Q designates a coil-spring of suitable strength to permit of the bicycle and the attachment yielding as said bicycle passes over the ground—such, for example, as when passing over elevations, depressions, or obstructions. This spring lies above the median part of the bow or yoke L and is attached by one end Q' thereof being carried downwardly below the disk C''. This end Q' is in the form of a loop, as shown in Fig. 7, and surrounds the bolt a and another bolt a', the latter bolt passing through the median portion of the bow or yoke L. The other end Q'' is in form of a loop, as shown in Fig. 1, and to this end Q'' a saddle is attached, said saddle consisting of a curved metallic plate R and inner padded portion R', which is attached to said metallic plate and conforms to the curvature thereof. The attachment of this saddle or pad with the extended end Q'' of the spring is effected by means of eyes f, which permit of said saddle moving freely along the loop Q'' of said spring. This saddle fits over the upper portion of the vehicle-axle A, as shown in Fig. 2, and the stress of the spring maintains it securely in such position. In connecting the attachment with the rear vehicle-axle the hooks or arms M are turned downwardly in the dotted positions, as shown in Fig. 2, and are moved below the said axle, as shown in Fig. 1, such movement being limited by the flanges O on said hooks or arms. The attachment is lowered to a horizontal position prior to this, as shown in Fig. 2, the saddle R in the meantime moving to the outer end of the loop Q''. The said saddle is then placed upon the axle A of the vehicle, as in Fig. 2, and the hooks or arms M are turned down to the dotted positions. The bow or yoke L is then pressed downwardly below the axle and the hooks or arms M turned upwardly in the rear of the axle A to prevent the attachment from leaving said axle. The tension of the spring extension Q'' holds the saddle in rigid contact with the axle A. The said saddle when in position upon the vehicle-axle A is stationary, and the spring extension Q'' will be permitted to move freely under the vibrations of the vehicle and the bicycle by means of the eyes f, through which the parallel parts of said extension Q'' loosely pass.

As before stated, the pressure of the spring extension Q'' holds the pad R in rigid contact with the axle A and at the same time permits any yielding of the attachment which may be due to the bicycle passing over obstructions, elevations, &c., and the hooks or arms M prevent the attachment from leaving the axle A. In turning the hooks or angular arms M out of either of the positions shown in Fig. 2 the pins d, which are on the ends of said hooks adjacent to the ends of the bow or yoke L, ride out of the cam-slots e and draw upon the springs N until said pins arrive again at the opposite cam-slots e, at which time the tension of the springs N draws the pins into the slots, as shown in Fig. 6. The swivels b permit of the turning of the hooks M in either direction without interfering with the springs N.

Having described my invention, I claim—

1. In an attachment for leading bicycles in the rear of vehicles, the combination with the steering-fork of a bicycle, a horizontal fork having a connection with said steering-fork, a bow or yoke having a pivotal connection with said horizontal fork, hooks or angular arms connected to the ends of said bow or yoke, said hooks or angular arms being adapted to inclose a vehicle-axle, a saddle adapted to inclose the upper portion of a vehicle-axle, and a spring connected to the median portion of said bow or yoke and to which said saddle is loosely connected the said spring serving to maintain said saddle in rigid contact with the vehicle-axle and to permit of the yielding motion of the attachment due to the moving vehicle, substantially as specified.

2. In a device for leading bicycles in the rear of vehicles, the combination with the steering-fork of a bicycle, a horizontal fork having a pivotal connection with said steering-fork, a yoke or bow having a pivotal connection with said horizontal fork, hooks or angular arms having swivel and spring-controlled connections with the ends of said bow or yoke, the said hooks or angular arms being adapted to be moved into two positions and to be locked in such positions, one of said positions securing the attachment to the rear axle of a vehicle, a saddle adapted to inclose the upper portion of said vehicle-axle between the said hooks or angular arms, a spring attached to the median portion of said bow or yoke, said spring having an extended portion to which the saddle is movably attached, and the said extended portion exerting pressure to maintain the saddle in rigid contact with the upper portion of the vehicle-axle, substantially as specified.

3. In a device for leading bicycles in the rear of vehicles, the combination of a fork adapted to be attached to the steering-fork of a bicycle, a bow having a spring-controlled and swivel connection with said fork, hooks or angular arms attached to the ends of said bow, a pin and slot on the adjacent ends of said bow and the angular arms by means of which said angular arms are locked in and out of operative positions, springs controlling said angular arms when in such locked positions, the said angular arms when in operative positions inclosing the rear axle of a vehicle and serving to prevent a disconnection of the attachment from the vehicle-axle when the vehicle is moving, a saddle inclosing the upper side of the vehicle-axle, a spring secured to the median portion of the bow, the said spring having an extended portion to which the saddle is loosely connected and by means of which the said saddle is maintained rigidly against the upper side of the vehicle-axle, substantially as specified.

In testimony whereof I affix my signature in presence of two witnesses.

JOHN B. DAVIS.

Witnesses:
A. J. FIORINI,
R. J. MCCARTY.